US011238394B2

(12) United States Patent
Mathiesen et al.

(10) Patent No.: US 11,238,394 B2
(45) Date of Patent: Feb. 1, 2022

(54) ASSESSMENT-BASED QUALIFIED CANDIDATE DELIVERY

(71) Applicant: Microsoft Technology Licensing, LLC, Redmond, WA (US)

(72) Inventors: Christian V. Mathiesen, Mountain View, CA (US); Emrecan Dogan, Menlo Park, CA (US); Alp Artar, Palo Alto, CA (US); Mustafa Emre Kazdagli, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 16/359,761

(22) Filed: Mar. 20, 2019

(65) Prior Publication Data

US 2020/0302368 A1   Sep. 24, 2020

(51) Int. Cl.
*G06Q 10/06* (2012.01)
*G06N 20/00* (2019.01)

(52) U.S. Cl.
CPC ....... *G06Q 10/06395* (2013.01); *G06N 20/00* (2019.01)

(58) Field of Classification Search
None
See application file for complete search history.

(56) References Cited

U.S. PATENT DOCUMENTS

| 7,778,938 | B2 | 8/2010 | Stimac |
| 9,378,486 | B2 | 6/2016 | Taylor et al. |
| 10,528,916 | B1 | 1/2020 | Taylor et al. |
| 2002/0119433 | A1 | 8/2002 | Callender |
| 2003/0191680 | A1 | 10/2003 | Dewar |
| 2005/0246299 | A1 | 11/2005 | Scarborough et al. |
| 2007/0088601 | A1 | 4/2007 | Money et al. |
| 2012/0084120 | A1* | 4/2012 | Hirsch ............... G06Q 30/0203 705/7.32 |
| 2012/0271774 | A1 | 10/2012 | Clegg |
| 2015/0235160 | A1* | 8/2015 | Larlus-Larrondo ......... G06Q 10/06398 705/7.42 |

(Continued)

OTHER PUBLICATIONS

Gupta, Anika, and Deepak Garg. "Applying data mining techniques in job recommender system for considering candidate job preferences." 2014 International Conference on Advances in Computing, Communications and Informatics (ICACCI). IEEE, 2014. (Year: 2014).*

(Continued)

*Primary Examiner* — Thomas L Mansfield
(74) *Attorney, Agent, or Firm* — Schwegman Lundberg & Woessner, P.A.

(57) ABSTRACT

The disclosed embodiments provide a system for processing data. During operation, the system obtains answers by a candidate to assessments related to qualifications for one or more opportunities. Next, the system applies a machine learning model to the answers and additional qualifications for an additional opportunity to produce a match score between the candidate and the additional opportunity. The system then compares the match score to a threshold to determine a recommendation related to applying to the additional opportunity by the candidate. Finally, the system outputs the recommendation in association with the additional opportunity.

18 Claims, 4 Drawing Sheets

(56) References Cited

U.S. PATENT DOCUMENTS

| | | | |
|---|---|---|---|
| 2015/0302436 A1* | 10/2015 | Reynolds | G06Q 30/0201 |
| | | | 705/7.32 |
| 2016/0162478 A1 | 6/2016 | Blassin et al. | |
| 2016/0196534 A1* | 7/2016 | Jarrett | G06Q 10/1053 |
| | | | 705/321 |
| 2017/0235848 A1* | 8/2017 | Van Dusen | G06F 30/20 |
| | | | 705/12 |
| 2017/0249595 A1* | 8/2017 | Krupa | G06Q 30/0201 |
| 2018/0005191 A1 | 1/2018 | Metrewar et al. | |
| 2018/0133900 A1* | 5/2018 | Breazeal | B25J 19/026 |
| 2018/0137527 A1* | 5/2018 | Noelting | G06Q 30/0203 |
| 2018/0308062 A1 | 10/2018 | Quitmeyer | |
| 2019/0114593 A1 | 4/2019 | Champaneria | |
| 2019/0122236 A1* | 4/2019 | Terry | G06N 5/02 |
| 2019/0164107 A1 | 5/2019 | Upadhyay et al. | |
| 2019/0188645 A1 | 6/2019 | Monasor et al. | |
| 2020/0167631 A1* | 5/2020 | Rezgui | G06F 8/30 |
| 2020/0184422 A1 | 6/2020 | Mondal et al. | |
| 2020/0302370 A1 | 9/2020 | Mathiesen et al. | |
| 2020/0302371 A1 | 9/2020 | Mathiesen et al. | |
| 2020/0302397 A1 | 9/2020 | Mathiesen et al. | |

OTHER PUBLICATIONS

"Non Final Office Action Issued in U.S. Appl. No. 16/359,777", dated Oct. 28, 2020, 14 Pages.

"Non Final Office Action Issued in U.S. Appl. No. 16/359,793", dated Nov. 4, 2020, 16 Pages.

"U.S. Appl. No. 16/359,757, Non Final Office Action dated Mar. 25, 2021", 23 pgs.

"U.S. Appl. No. 16/359,777, Final Office Action dated May 25, 2021", 13 pgs.

"U.S. Appl. No. 16/359,793, Final Office Action dated Jun. 4, 2021", 13 pgs.

* cited by examiner

FIG. 4

ASSESSMENT-BASED QUALIFIED CANDIDATE DELIVERY

RELATED APPLICATIONS

The subject matter of this application is related to the subject matter in a co-pending non-provisional application by the same inventors as the instant application and filed on the same day as the instant application, entitled "Screening-Based Opportunity Enrichment," having Ser. No. 16/359,757 and filing date Mar. 20, 2019.

The subject matter of this application is related to the subject matter in a co-pending non-provisional application by the same inventors as the instant application and filed on the same day as the instant application, entitled "Mapping Assessment Results to levels of Experience," having Ser. No. 16/359,777 and filing date Mar. 20, 2019.

The subject matter of this application is also related to the subject matter in a co-pending non-provisional application by the same inventors as the instant application and filed on the same day as the instant application, entitled "Assessment-Based Opportunity Exploration," having Ser. No. 16/359,793, and filing date Mar. 20, 2019.

BACKGROUND

Field

The disclosed embodiments relate to assessment of candidates. More specifically, the disclosed embodiments relate to techniques for performing assessment-based qualified candidate delivery.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for using assessments to improve targeting and placement of candidates with opportunities. In these embodiments, assessments include techniques and/or data that are used to determine qualifications of the candidates for the opportunities. For example, an assessment may include a screening question that is presented to a candidate to determine whether the candidate meets a corresponding requirement for a job. In another example, an assessment may include a skill assessment of a candidate, in which the candidate's proficiency in a corresponding skill is determined based on the candidate's answers to a series of questions related to the skill. As a result, assessments can be used to identify highly qualified candidates for the opportunities, thus reducing overhead associated with applying to and/or filling the opportunities.

More specifically, the disclosed embodiments provide a method, apparatus, and system for performing assessment-based delivery of qualified candidates. In these embodiments, a candidate's answers to screening questions, skill assessment scores, and/or other assessment results are collected as the candidate browses, searches for, and/or applies to jobs and/or during the candidate's interaction with an employment, recruiting, or job search tool. The assessment results are stored with the candidate's consent, and a machine learning model is applied to the assessment results and additional features related to other jobs and/or moderators of the jobs to produce match scores between the candidate and the other jobs. Each match score may represent the likelihood of a positive outcome between the candidate and a corresponding job, such as the probability that the candidate hears back from a moderator of the job after the candidate applies to the job.

When a match score between the candidate and a job exceeds a threshold, a recommendation related to the candidate and job is generated and/or outputted. For example, the recommendation may be transmitted to the candidate and indicate that the candidate has a high likelihood of receiving a response from a moderator of the job after applying to the job. In another example, the recommendation may be transmitted to the moderator and indicate that the candidate is highly qualified and/or a good fit for the job.

Because features inputted into the machine learning model include representations of candidate preferences, moderator preferences, and/or comparisons of the candidates' assessment results with requirements or qualifications of jobs, match scores generated between the candidates and jobs may reflect the extent to which each candidate is qualified for a corresponding job. In turn, recommendations and/or outcomes related to the jobs and candidates are more relevant, and the candidates are more likely to be interested/qualified for the jobs. In contrast, conventional techniques lack the ability to leverage assessment results associated with certain jobs in matching candidates with additional jobs. Instead, candidates may be required to manually search for and/or browse jobs for which the candidates are qualified and/or complete individual assessments for each job, which is a time consuming and laborious process. Consequently, the disclosed embodiments may improve computer systems, applications, user experiences, tools, and/or technologies related to user recommendations, employment, recruiting, and/or hiring.

Assessment-Based Qualified Candidate Delivery

Figure 1:
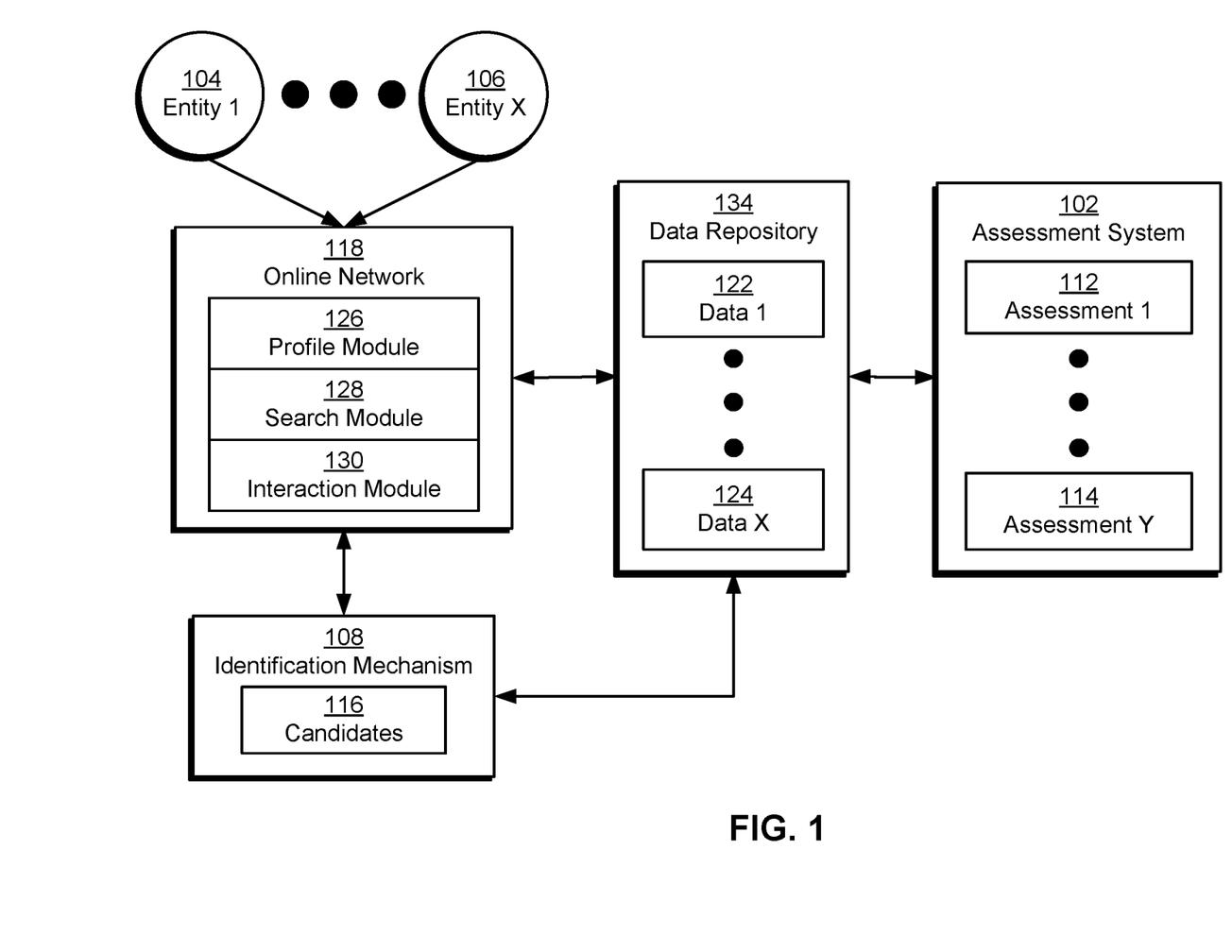
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

In one or more embodiments, rankings and/or recommendations related to candidates 116 and/or opportunities are generated based on assessments (e.g., assessment 1 112, assessment y 114) of candidates 116 with respect to the opportunities. Such assessments include techniques and/or data for verifying or ascertaining the qualifications of candidates 116 for the opportunities.

In one or more embodiments, assessments include screening questions that are presented to some or all candidates 116 for a given opportunity to determine whether candidates 116 meet requirements for the opportunity. Each screening question may specify a parameter and a condition associated with the parameter. For example, the screening question may ask a candidate to provide the number of years of experience he or she has with a skill (e.g., "How many years of programming experience do you have?"), tool (e.g., "How many years of work experience do you have using Microsoft Office?"), and/or other type of parameter representing a job-related qualification. In another example, a screening question may ask the candidate to provide a yes/no answer related to a language (e.g., "Do you speak Spanish?"), work authorization (e.g., "Are you authorized to work in the United States?"), license or certification (e.g., "Do you have a license or certification in CPR & AED"), location (e.g., "Are you willing to relocate to the SF Bay Area?"), and/or security clearance (e.g., "Do you possess a security clearance with the United States government?"), and/or other type of parameter representing a job-related qualification.

A candidate's answer to a screening question may then be compared with a value, range of values, set of values, and/or threshold associated with the corresponding parameter or qualification to identify one or more jobs for which the candidate is qualified or not qualified. For example, the candidate may be prompted to answer a series of screening questions for a specific job; if the candidate's answers to the screening questions meet the job's requirements, the candidate may be allowed to apply for the job. In another example, the candidate may opt in to a setting and/or preference that stores the candidate's previous answers to screening questions. In turn, the stored answers may be used to match the candidate to additional jobs and/or opportunities for which the candidate is qualified.

In one or more embodiments, assessments include skill assessments of candidates 116. Each skill assessment determines the proficiency of candidates 116 in a given skill based on the candidates' answers to a series of questions related to the skill. The skill assessment may be adaptive, in which the difficulty of a subsequent question is selected and/or adjusted based on the correctness of the candidate's answer's to previous questions in the skill assessment. Consequently, screening questions, skill assessments, and/or other types of assessments can be used to identify highly qualified candidates for the opportunities, thus reducing overhead associated with applying to and/or filling the opportunities.

An assessment system 102 provided by and/or accessed through online network 118 interacts with candidates 116 to perform assessments of candidates 116. For example, assessment system 102 may form a part of a recruiting and/or job search product or tool offered by or through online network 118. As a result, assessment system 102 may integrate with other features of online network 118, such as profile module 126, search module 128, and/or interaction module 130. As a candidate browses and/or searches for jobs and/or other opportunities through online network 118, assessment system 102 may present the candidate with screening questions, skill assessments, and/or other types of assessments related to qualifications of the jobs and/or opportunities. Assessment system 102 may also, or instead, include modules or user-interface elements that allow candidates 116 to voluntarily provide answers to screening questions and/or take skill assessments separately from job searches or job browsing conducted by candidates 116.

In one or more embodiments, online network 118 and/or assessment system 102 include functionality to reuse assessment results obtained from candidates 116 in matching candidates 116 with additional jobs and/or opportunities posted in online network 118. For example, online network 118 and/or assessment system 102 may store answers by candidates 116 to screening questions and/or scores of candidates 116 for skill assessments. Online network 118 and/or assessment system 102 may then match the answers to additional jobs and/or opportunities for which the corresponding candidates 116 are qualified and recommend the jobs and/or opportunities to candidates 116 and/or moderators of the jobs or opportunities.

Figure 2:
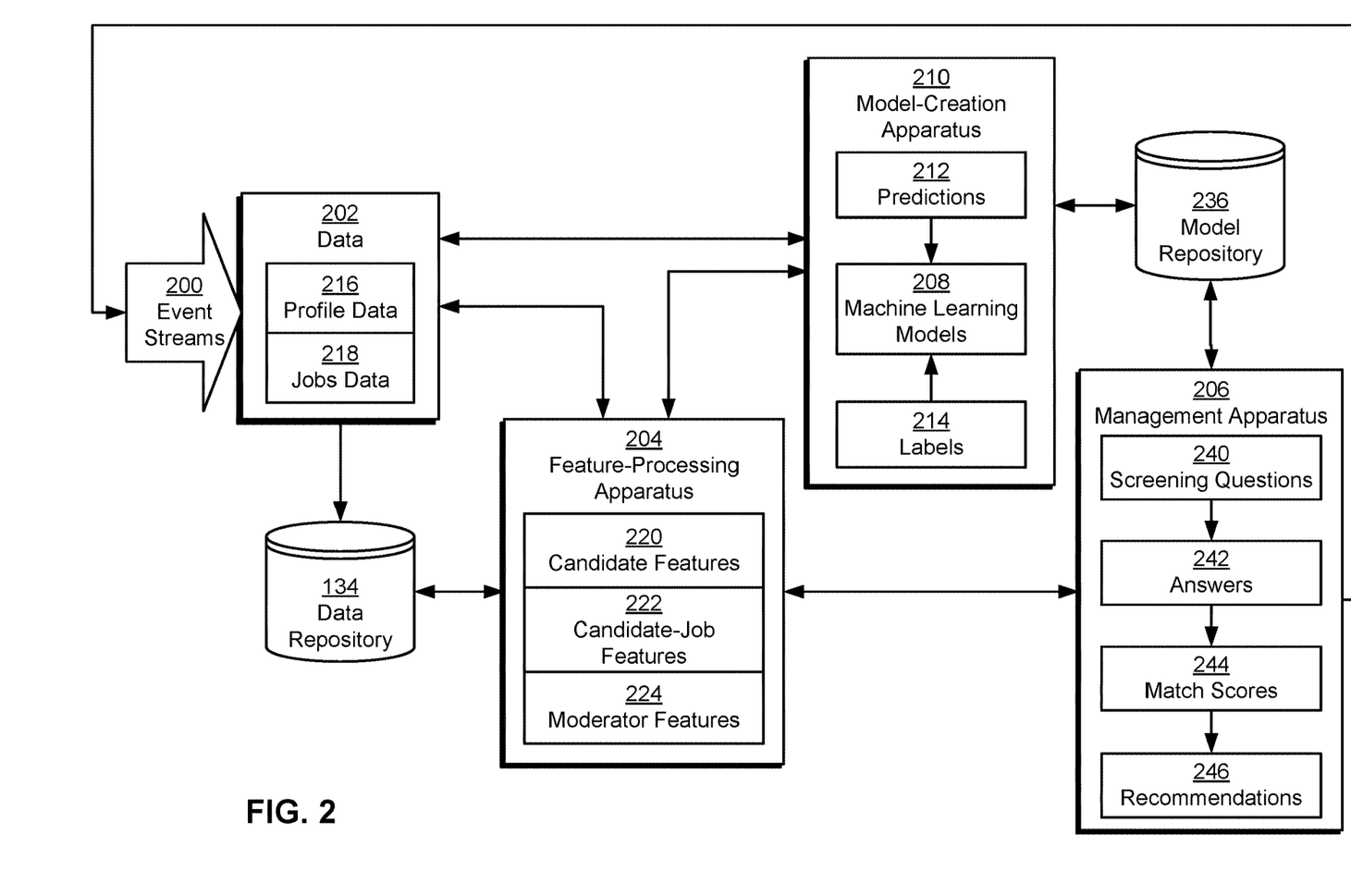
FIG. 2 shows a system for processing data in accordance with the disclosed embodiments.

As shown in FIG. 2, data repository 134 and/or another primary data store may be queried for data 202 that includes profile data 216 for members of an online network (e.g., online network 118 of FIG. 1), as well as jobs data 218 for jobs that are listed or described within or outside the online network. Profile data 216 includes data associated with member profiles in the online network. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, and/or other data related to the user's interaction with the online network.

Attributes of the members from profile data 216 may be matched to a number of member segments, with each member segment containing a group of members that share one or more common attributes. For example, member segments in the online network may be defined to include members with the same industry, title, location, and/or language.

Connection information in profile data 216 may additionally be combined into a graph, with nodes in the graph representing entities (e.g., users, schools, companies, locations, etc.) in the online network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 may include structured and/or unstructured data for job listings and/or job descriptions that are posted and/or provided by members of the online network. For example, jobs data 218 for a given job or job listing may include a declared or inferred title, company, required or desired skills, responsibilities, qualifications, role, location, industry, seniority, salary range, benefits, education level, and/or member segment.

Jobs data 218 may also, or instead, include one or more screening questions 240 that ascertain the qualifications of candidates (e.g., candidates 116 of FIG. 1) for the corresponding jobs. A moderator of a job may specify a screening question for the job by selecting a category associated with the screening question, such as work experience, education, location, work authorization, language, visa status, certifications, expertise with tools, and/or security clearances. The moderator may then select from a set of available parameters and/or conditions associated with the category, such as values and/or thresholds representing requirements or qualifications for the job.

In one or more embodiments, data repository 134 stores data 202 that represents standardized, organized, and/or classified attributes. For example, skills in structured jobs data 216 and/or unstructured jobs data 218 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

A feature-processing apparatus 204 uses data 202 from event streams 200 and/or data repository 134 to calculate features for a candidate and/or one or more jobs. For example, feature-processing apparatus 204 may execute on an offline, periodic, and/or batch-processing basis to produce features for a large number of candidates and/or candidate-job pairs (e.g., combinations of members in the online network and jobs for which the members may be qualified). In another example, feature-processing apparatus 204 may generate features in an online, nearline, and/or on-demand basis based on recent job-seeking activity by a candidate and/or moderator (e.g., a user session with the community, a job search, a moderator's search for candidates, a job view, a click on a job, an application for a job, etc.).

More specifically, feature-processing apparatus 204 generates candidate features 220 for candidates, candidate-job features 222 for candidate-job pairs, and/or moderator features 224 for moderators of jobs. In some embodiments, candidate features 222 include attributes and/or preferences of individual candidates. For example, candidate features 220 may include each candidate's name, school, title, seniority, employment history, skills, recommendations, endorsements, awards, honors, publications, and/or other fields in profile data 216. In another example, candidate features 220 may include a job-seeker score that classifies the member's job-seeking status as a job seeker or non-job-seeker and/or estimates the member's level of job-seeking interest. In a third example, candidate features 220 may include the amount of time since a candidate has expressed openness or availability for new opportunities (e.g., as a profile setting and/or job search setting). In a fourth example, candidate features 220 may include views, searches, applications, and/or other activity of the member with job postings and/or views or searches of company-specific pages in the online network.

Candidate features 220 may also, or instead, include measures of the candidate's popularity with job moderators and/or the candidate's willingness to interact with recruiters. For example, candidate features 220 related to a candidate's popularity may include the number of messages sent to the candidate by recruiters, the number of recruiter messages accepted (e.g., opened, responded to, etc.) by the candidate, a percentage of messages accepted by the candidate, message delivery settings of the candidate, and/or the number of times the candidate has been viewed in search results by recruiters.

In some embodiments, candidate-job features 222 include metrics and/or attributes related to a candidate's compatibility and/or interaction with a job or other type of opportunity. For example, candidate-job features 222 may include a match score between the member and the opportunity, which can be calculated based on overlap or commonality between the member's attributes in profile data 216 and the corresponding attributes in jobs data 218 for the opportunity (e.g., similarity in country, seniority, industry, and/or function between the member and opportunity). In another example, candidate-job features 222 may include cross products, cosine similarities, Jaccard similarities, Euclidean distances, and/or other measures of similarity between the candidate's skills and skills listed in the job; the candidate's current title and/or past titles and the job's title; and/or the candidate's headline and/or summary (e.g., in the candidate's resume, online network profile, etc.) and the job's description.

Candidate-job features 222 may also include a measure of connectedness of a candidate to an employer associated with an opportunity. For example, candidate-job features 222 may indicate whether the candidate has a connection to an employee of the employer and/or the number of connections the member has with employees of the employer.

In one or more embodiments, candidate-job features 222 include comparisons of answers 242 by a candidate to screening questions 240 with requirements or qualifications for a job. As shown in FIG. 2, management apparatus 206 obtains answers 242 to screening questions 240 as the candidate browses, searches for, and/or interacts with jobs posted in the online network. Management apparatus 206 and/or another component of the system may also provide user settings, preferences, and/or prompts that allow the candidate to store his/her answers 242 to screening questions 240 for use in recommending and/or filtering additional jobs. After the candidate grants permission and/or "opts in" to store answers 242 and/or other assessment results for use with additional jobs, the component may create records of the assessment results in data repository 134 and/or another data store.

During subsequent generation of candidate-job features 222 involving the candidate, feature-processing apparatus 204 may retrieve the records from the data store and generate encodings of the candidate's answers 242 to screening questions 240 with respect to qualifications of a given job. For example, feature-processing apparatus 204 may produce a vector containing a one-hot encoding from answers 242 and the job's qualifications, with each element in the vector storing a value indicating whether or not a declared or inferred requirement of the job is met by the candidate's answers 242. If the requirement is met by the candidate's answers 242, the element may store a value of 1. If the requirement is not met by the candidate's answers 242, the element may store a value of 0.

In some embodiments, moderator features 224 characterize the behavior and/or preferences of recruiters, hiring managers, and/or other moderators of jobs posted in the online network. For example, moderator features 224 may include the number of candidate impressions a recruiter has across all searches, the number of candidate profiles viewed by the recruiter (e.g., after clicking on the corresponding search results and/or through other parts of the recruiting tool), the number of messages sent by the recruiter to candidates, and/or the number of messages sent by the recruiter that are accepted by the candidates. In another example, moderator features 224 may include the moderator's historical response rate to job applications and/or historical success rate in placing jobs. In a third example, moderator features 224 may include scores and/or metrics representing the moderator's preferences for or against various candidate attributes, such as the candidates' education, work experience, previous employers, industry, location, seniority, skills, answers 242 to screening question 240, and/or skill assessment scores.

After candidate features 220, candidate-job features 222, and/or moderator features 224 are calculated for one or more candidate-job pairs, feature-processing apparatus 204 may store candidate features 220, candidate-job features 222, and/or moderator features 224 in data repository 134 for subsequent retrieval and use. Feature-processing apparatus 204 may also, or instead, provide the features to a model-creation apparatus 210, a management apparatus 206, and/or another component of the system for use in creating and/or executing machine learning model 208 using the features.

Model-creation apparatus 210 trains and/or updates one or more machine learning models 208 using sets of features from feature-processing apparatus 204, labels 214 associated with the feature sets, and predictions 212 produced by machine learning models 208 from the feature sets. In general, model-creation apparatus 210 may produce machine learning models 208 that generate predictions and/or estimates related to the candidates' compatibility with jobs and/or moderators of the jobs.

First, model-creation apparatus 210 inputs a set of features for each candidate-job pair into one or more machine learning models 208 to obtain a prediction representing a match score between the candidate and job. For example, model-creation apparatus 210 may apply a logistic regression model, tree-based model, artificial neural network, and/or other type of machine learning model to the features to produce a score from 0 to 1 that represents the probability of a positive outcome involving the candidate and job (e.g., the moderator of the job responds to the candidate's application to the job, the candidate accepts a message from the moderator, etc.).

Next, model-creation apparatus 210 updates parameters of machine learning models 208 based on differences between match scores 244 and/or other predictions outputted by machine learning model 208 and labels 214 associated with the predictions. For example, model-creation apparatus 210 may obtain and/or generate positive labels 214 for positive outcomes (e.g., views of candidate profiles, messages from moderators to candidates, adding candidates to hiring pipelines, scheduling interviews with candidates, hiring of candidates, etc.) associated with screening questions 240 and/or the corresponding job applications. Similarly, model-creation apparatus 210 may obtain and/or generate negative labels 214 for negative outcomes (e.g., rejecting candidates, ignoring candidates, etc.) associated with screening questions 240 and/or the corresponding job applications. After labels 214 are obtained or produced, model-creation apparatus 210 may use a training technique and/or one or more hyperparameters to update parameters (e.g., coefficients, weights, etc.) of machine learning models 208 based on candidate features 220, candidate-job features 222, and/or moderator features 224 and the corresponding predictions 212 and labels 214.

After machine learning models 208 are created and/or updated, model-creation apparatus 210 stores parameters of machine learning models 208 in a model repository 236. For example, model-creation apparatus 210 may replace old values of the parameters in model repository 236 with the updated parameters, or model-creation apparatus 210 may store the updated parameters separately from the old values (e.g., by storing each set of parameters with a different version number of the corresponding machine learning model).

Management apparatus 206 generates recommendations 246 related to candidates and jobs based on data 202 in data repository 134. For example, management apparatus 206 may generate recommendations 246 as search results of the candidates' job searches, search results of recruiters' candidate searches for specific jobs, job recommendations that are displayed and/or transmitted to the candidates, and/or within other contexts related to job seeking, recruiting, careers, and/or hiring.

To generate recommendations 246, management apparatus 206 obtains representations of machine learning models 208 from model-creation apparatus 210, data repository 134, and/or another source. Next, management apparatus 206 uses machine learning models 208 and the corresponding candidate features 220, candidate-job features 222, and/or moderator features 224 from feature-processing apparatus 204 to generate match scores 244 for one or more candidate-job pairs. As with generation of candidate features 220, candidate-job features 222, and/or moderator features 224, match scores 244 may be produced in an offline, batch-processing, and/or periodic basis (e.g., from batches of candidate features 220, candidate-job features 222, and/or moderator features 224), or match scores 244 may be generated in an online, nearline, and/or on-demand basis (e.g., when a candidate or moderator logs in to the online network, views a job, performs a search, applies for a job, and/or performs another action).

As mentioned above, match scores 244 may be representations of predictions 214 from machine learning models 208. For example, management apparatus 206 may apply a logistic regression model, deep learning model, support vector machine, tree-based model, and/or another type of machine learning model to features for a candidate-job pair to produce a match score from 0 to 1. The match score may represent the likelihood of a positive outcome associated with the candidate and job, such as the probability that the candidate receives a response to a job application, given a submission of the application by the candidate; a moderator of the job views the candidate's profile; an interview of the candidate for the job is scheduled; the candidate is added to a hiring pipeline for the job; and/or the candidate is hired for the job.

In one or more embodiments, management apparatus 206 uses one or more thresholds with match scores 244 to derive insights related to response rates for applications and/or make recommendations 246 based on the insights. For example, management apparatus 206 may rank jobs for a candidate by descending match score and recommend, to the candidate, a pre-specified number or percentile of highest-ranked jobs and/or a variable number of jobs with match scores 244 that exceed a numeric threshold. In another example, management apparatus 206 may rank candidates by descending match score with a job and recommend, to the job's moderator, a pre-specified number or percentile of highest-ranked candidates and/or a variable number of candidates with match scores 244 that exceed a numeric threshold.

Management apparatus 206 also, or instead, uses screening questions 240 to filter and/or update recommendations 246. For example, management apparatus 206 may use a candidate's stored answers 242 to screening questions 240 to remove jobs for which the candidate is not qualified from recommendations 246. As a result, management apparatus 206 may use answers 242 to perform "hard" filtering of recommendations 246, in lieu of or in addition to "soft" filtering of recommendations 246 based on candidate-job features 222 that include comparisons of answers 242 with the corresponding job requirements.

Management apparatus 206 and/or another component may additionally track responses to recommendations 246 and/or applications to the corresponding jobs. For example, the component may generate records and/or labels 214 for positive responses such as views of candidate profiles, messages from job moderators to candidates, scheduling of interviews for candidates, adding candidates to hiring pipelines, and/or hiring of candidates. The component may also, or instead, generate records and/or labels 214 for negative responses such as rejections of candidates by moderators and/or lack of action on candidates by the moderators after candidates apply to jobs and/or pass screening questions 240 for the jobs.

In turn, model-creation apparatus 210 uses labels 214 associated with the responses to update machine learning models 208. For example, model-creation apparatus 210 may update parameters of machine learning models 208 so that machine learning models 208 better predict positive and negative labels 214 from the corresponding candidate features 220, candidate-job features 222, and/or moderator features 224. As a result, the accuracy and/or relevance of recommendations 246 may improve over time.

Because features inputted into machine learning models 208 include representations of candidate preferences, moderator preferences, and/or comparisons of answers 242 to screening questions 240 and/or other types of assessment results for candidates with requirements or qualifications of jobs, match scores 244 generated between the candidates and jobs may reflect the extent to which each candidate is qualified for a corresponding job. In turn, recommendations 246 and/or outcomes related to the jobs and candidates may be more relevant or accurate than recommendations that do not account for candidate qualifications that are based on previously collected assessment results for the candidates, and the candidates are more likely to be interested/qualified for the jobs. In contrast, conventional techniques may lack the ability to leverage assessment results associated with certain jobs in matching candidates with additional jobs. Instead, candidates may be required to manually search for and/or browse jobs for which the candidates are qualified and/or complete individual assessments for each job, which is a time consuming and laborious process. Consequently, the disclosed embodiments may improve computer systems, applications, user experiences, tools, and/or technologies related to user recommendations, employment, recruiting, and/or hiring.

Those skilled in the art will appreciate that the system of FIG. 2 may be implemented in a variety of ways. First, feature-processing apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Feature-processing apparatus 204, model-creation apparatus 210, and management apparatus 206 may additionally be implemented together and/or separately by one or more hardware and/or software components and/or layers.

Second, a number of models and/or techniques may be used to generate match scores 244, recommendations 246, and/or other output used to improve the matching of candidates with jobs or opportunities. For example, the functionality of machine learning models 208 may be provided by a regression model, artificial neural network, support vector machine, decision tree, naïve Bayes classifier, Bayesian network, clustering technique, collaborative filtering technique, deep learning model, hierarchical model, and/or ensemble model. One or more machine learning models 208 may additionally be customized and/or personalized to reflect the preferences and/or behavior of one or more candidates, moderators, and/or other entities involved in applying or hiring for the opportunities. The retraining or execution of machine learning models 208 may also be performed on an offline, online, and/or on-demand basis to accommodate requirements or limitations associated with the processing, performance, or scalability of the system and/or the availability of candidate features 220, candidate-job features 222, moderator features 224, and/or labels 214 used to train the machine learning model 208.

Third, the system of FIG. 2 may be adapted to various types of opportunities and/or candidates. For example, the functionality of the system may be used to match candidates to academic positions, artistic or musical roles, school admissions, fellowships, scholarships, competitions, club or group memberships, matchmaking, and/or other types of opportunities.

Figure 3:
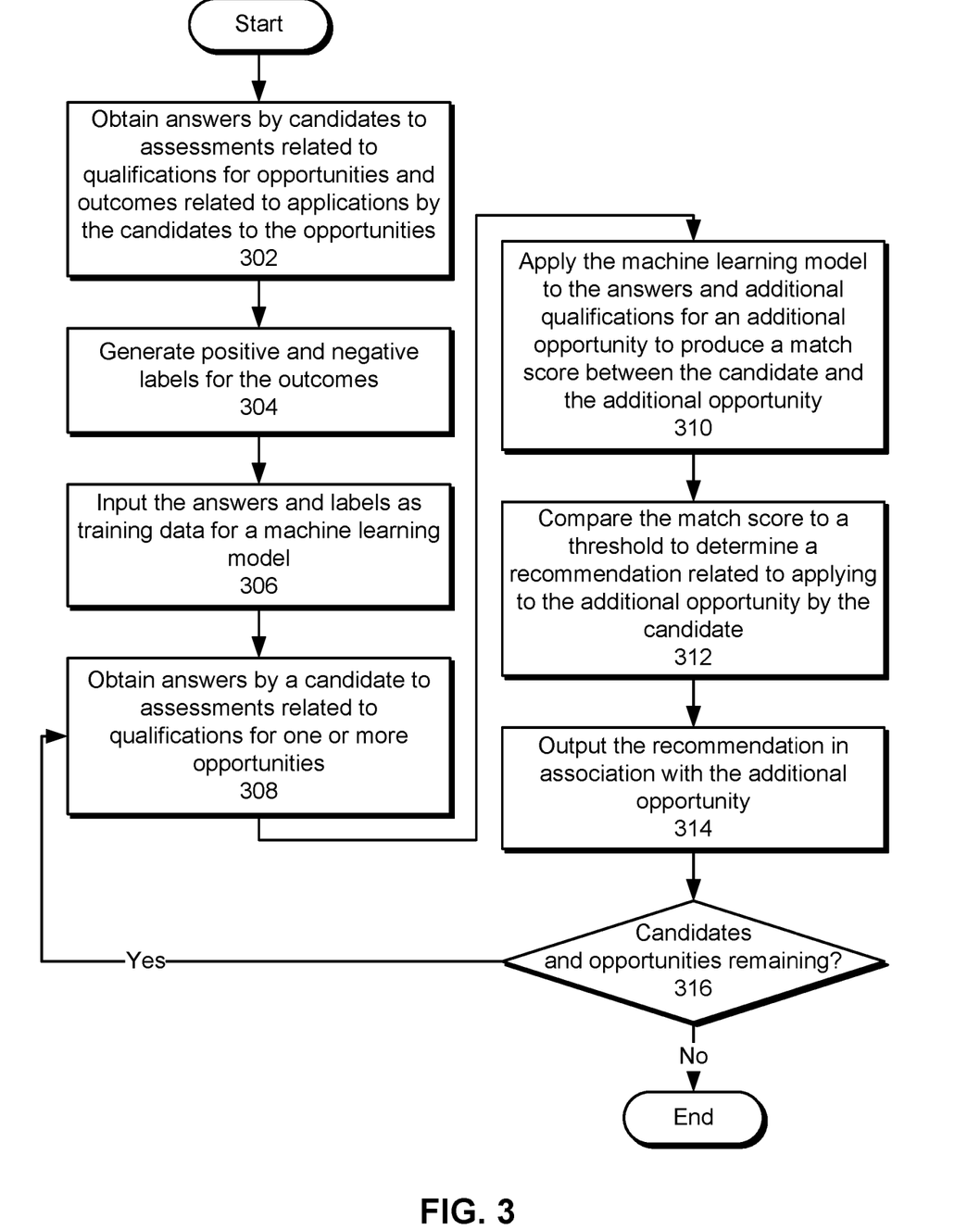
FIG. 3 shows a flowchart illustrating a process of performing assessment-based qualified candidate delivery in accordance with the disclosed embodiments.

FIG. 3 shows a flowchart illustrating a process of performing assessment-based qualified candidate delivery in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, answers by candidates to assessments related to qualifications for opportunities and outcomes related to applications by the candidates to the opportunities are obtained (operation 302). For example, the answers may include answers to screening questions and/or skill assessments by the candidates. In turn, the outcomes may include positive outcomes such as profile views of candidates for a given opportunity, messages from moderators to candidates regarding the opportunities, scheduling of interviews of candidates for the opportunities, addition of candidates to hiring pipelines for the opportunities, and/or hiring of candidates for the opportunities. The outcomes may also include negative outcomes such as rejections of candidates for opportunities and/or a lack of action on candidates by moderators for the opportunities.

Next, positive and negative labels are generated for the outcomes (operation 304), and the answers and labels are inputted as training data for a machine learning model (operation 306). For example, positive labels of 1 may be generated for positive outcomes associated with the candidates, and negative labels of 0 may be generated for negative outcomes associated with the candidates. The answers and labels may then be used to update parameters of the machine learning model so that predictions outputted by the machine learning model based on the answers reflect the corresponding outcomes.

After the machine learning model is created and/or updated, answers by a candidate to assessments related to qualifications for one or more opportunities are obtained (operation 308). For example, the candidate may provide the answers as the candidate browses, searches for, views, and/or applies for the opportunities or interacts with a job search or employment tool.

The machine learning model is applied to the answers and additional qualifications for an additional opportunity to produce a match score between the candidate and the additional opportunity (operation 310). For example, an encoding of comparisons of the answers with the additional qualifications may be inputted with additional features representing preferences of the candidate and/or a moderator of the additional opportunity into the machine learning model. In turn, the machine learning model may output a match score representing the likelihood of a positive interaction or outcome related to the candidate and the additional opportunity, such as the probability that the candidate receives a profile view, message, scheduled interview, and/or offer from the moderator after the candidate applies to the additional opportunity.

In addition, the match score may be calculated based on attributes associated with moderators that are similar to a moderator for the additional opportunity. For example, a collaborative filtering technique may be used to identify the similar moderators and calculate the match score based on behavior, preferences, and/or outcomes of the similar moderators with respect to the candidate and/or other candidates that are similar to the candidate.

The match score is then compared to a threshold to determine a recommendation related to applying to the additional opportunity by the candidate (operation 312), and the recommendation is outputted in association with the additional opportunity (operation 314). For example, a threshold representing a high probability of a positive outcome may be applied to the match score. When the match score exceeds the threshold, a recommendation of the opportunity to the candidate (e.g., an indication that the candidate has a high likelihood of receiving a response from a moderator of the opportunity) and/or a recommendation of the candidate to the moderator (e.g., a notification to the moderator that the candidate is a good fit for the opportunity) may be generated and outputted.

Operations 308-314 may be repeated for additional candidates and opportunities (operation 316). For example, answers by candidates to assessments may continue to be obtained during interaction of the candidates with opportunities. The machine learning model may be used to generate match scores for a number of candidate-opportunity pairs, and recommendations of the candidates and/or opportunities may be generated based on the match scores and one or more corresponding thresholds. Operations 302-306 may additionally be performed periodically and/or continually to update the machine learning model based on answers and corresponding outcomes associated with the candidates and opportunities. Such generation of recommendations and updating of the machine learning model may continue until the machine learning model is no longer used to produce predictions and/or recommendations related to applying to opportunities by the candidates.

Figure 4:
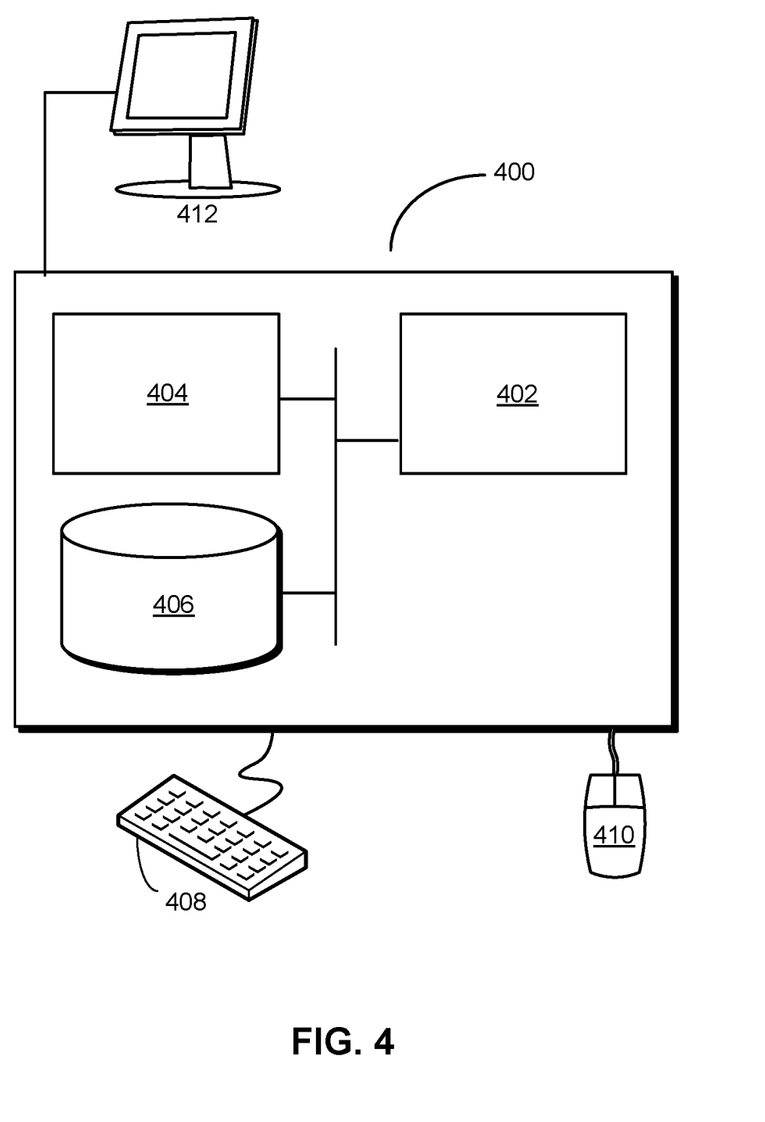
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for a user (e.g., a candidate and/or moderator for an opportunity). To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a model-creation apparatus, a feature-processing apparatus, and a management apparatus, one or more of which may alternatively be termed or implemented as a module, mechanism, or other type of system component. The model-creation apparatus obtains answers by candidates to assessments and outcomes related to applications by the other candidates to one or more opportunities. The model-creation apparatus also generates positive labels and negative labels for the outcomes and inputs the answers and the labels as training data for the machine learning model.

The feature-processing apparatus obtains answers by a candidate to assessments related to qualifications for one or more opportunities. Next, the management apparatus applies a machine learning model to the answers and additional qualifications for an additional opportunity to produce a match score between the candidate and the additional opportunity. The management apparatus then compares the match score to a threshold to determine a recommendation related to applying to the additional opportunity by the candidate. Finally, the management apparatus outputs the recommendation in association with the additional opportunity.

In addition, one or more components of computer system 400 may be remotely located and connected to the other components over a network. Portions of the present embodiments (e.g., feature-processing apparatus, model-creation apparatus, management apparatus, data repository, model repository, online network, etc.) may also be located on different nodes of a distributed system that implements the embodiments. For example, the present embodiments may be implemented using a cloud computing system that recommends opportunities to a set of remote candidates within or through an online network.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    training a machine learning model to output a match score for a first candidate and an employment opportunity, by:
        obtaining from a plurality of candidates a plurality of answers to a plurality of assessments, each assessment associated with a qualification requirement for an employment opportunity, each answer indicating an extent to which a candidate satisfies the qualification requirement for the employment opportunity;
        obtaining information indicating outcomes relating to employment applications submitted by the plurality of candidates for employment opportunities associated with the plurality of assessments;
        generating positive labels for positive outcomes and negative labels for negative outcomes; and;
        providing as training data the plurality of answers and the positive labels and negative labels for training the machine learning model; and
    obtaining answers by the first candidate to assessments relating to qualification requirements for one or more employment opportunities;
    applying, by one or more computer systems, the machine learning model to the answers provided by the first candidate, additional features of the first candidate, and qualification requirements for an additional employment opportunity, to produce a match score between the first candidate and the additional employment opportunity;
    comparing the match score to a threshold to determine that a recommendation relating to the additional employment opportunity is to be presented to the first candidate; and
    causing the recommendation relating to the additional employment opportunity to be presented to the first candidate via a user interface.

2. The method of claim 1, wherein generating the positive labels and the negative labels for the outcomes comprises:
    generating a positive label for an outcome comprising at least one of a profile view of a first candidate, a message from a moderator of an employment opportunity to a second candidate, scheduling of an interview of a third candidate, addition of a fourth candidate to a hiring pipeline, and hiring of a fifth candidate for the employment opportunity.

3. The method of claim 1, wherein generating the positive labels and the negative labels for the outcomes comprises:
    generating a negative label for an outcome comprising at least one of a rejection of a first candidate and a lack of action on a second candidate by a moderator.

4. The method of claim 1, wherein applying the machine learning model to the answers provided by the first candidate, the additional features of the first candidate, and the qualification requirements for the additional employment opportunity, to produce the match score between the first candidate and the additional employment opportunity comprises:
   calculating the match score based on attributes associated with moderators that are similar to a moderator for the additional employment opportunity.

5. The method of claim 1, wherein applying the machine learning model to the answers provided by the first candidate, the additional features of the first candidate, and the qualification requirements for the additional employment opportunity to produce the match score between the first candidate and the additional employment opportunity comprises:
   inputting an encoding of comparisons of the answers provided by the first candidate with the additional qualification requirements of the first candidate for the additional employment opportunity into the machine learning model.

6. The method of claim 1, wherein the assessments comprise:
   a parameter; and
   a condition associated with the parameter.

7. The method of claim 6, wherein the parameter comprises at least one of:
   a title;
   a description;
   a function;
   an industry;
   a seniority level;
   a type of employment;
   a skill; and
   an educational background.

8. The method of claim 1, wherein the assessments comprise at least one of:
   a screening question; and
   a skill assessment.

9. The method of claim 1, wherein the recommendation comprises an indication of a high likelihood of the candidate receiving a response from a moderator of the additional employment opportunity after applying to the additional employment opportunity.

10. The method of claim 1, wherein the recommendation comprises a notification to a moderator of the additional employment opportunity of a good fit between the candidate and the additional employment opportunity.

11. A system, comprising:
   one or more processors; and
   memory storing instructions that, when executed by the one or more processors, cause the system to:
   train a machine learning model to output a match score for a first candidate and an employment opportunity, by:
      obtaining from a plurality of candidates a plurality of answers to a plurality of assessments, each assessment associated with a qualification requirement for an employment opportunity, each answer indicating an extent to which a candidate satisfies the qualification requirement for the employment opportunity;
      obtaining information indicating outcomes relating to employment applications submitted by the plurality of candidates for employment opportunities associated with the plurality of assessments;
      generating positive labels for positive outcomes and negative labels for negative outcomes; and
      providing as training data the plurality of answers and the positive labels and negative labels for training the machine learning model; and
   generate the match score for the first candidate and the employment opportunity, by:
      obtaining answers by the first candidate to assessments relating to qualifications for one or more employment opportunities;
      applying the machine learning model to the answers, additional features of the candidate, and qualification requirements for an additional employment opportunity to produce a match score between the candidate and the additional employment opportunity;
      comparing the match score to a threshold to determine that a recommendation relating to the additional employment opportunity is to be presented to the candidate; and
      causing the recommendation relating to the additional employment opportunity to be presented to the candidate via a user interface.

12. The system of claim 11, wherein applying the machine learning model to the answers, the additional features of the candidate, and qualification requirements for the additional employment opportunity to produce the match score between the candidate and the additional employment opportunity comprises:
   calculating the match score based on attributes associated with moderators that are similar to a moderator for the additional employment opportunity.

13. The system of claim 11, wherein applying the machine learning model to the answers, the additional features of the candidate, and the qualification requirements for the additional employment opportunity to produce the match score between the candidate and the additional employment opportunity comprises:
   inputting an encoding of comparisons of the answers with the additional qualification requirements for the additional employment opportunity into the machine learning model.

14. The system of claim 11, wherein the assessments comprise:
   a parameter; and
   a condition associated with the parameter.

15. The system of claim 14, wherein the parameter comprises at least one of:
   a title;
   a description;
   a function;
   an industry;
   a seniority level;
   a type of employment;
   a skill; and
   an educational background.

16. The system of claim 11, wherein the assessments comprise at least one of:
   a screening question; and
   a skill assessment.

17. The system of claim 11, wherein the recommendation comprises at least one of:
   an indication of a high likelihood of the candidate receiving a response from a moderator of the additional employment opportunity after applying to the additional employment opportunity; and
   a notification to the moderator of the additional employment opportunity of a good fit between the candidate and the additional employment opportunity.

18. A non-transitory computer-readable storage medium storing instructions that when executed by a computer cause the computer to perform a method, the method comprising:
training a machine learning model to output a match score for a first candidate and an employment opportunity, by:
obtaining from a plurality of candidates a plurality of answers to a plurality of assessments, each assessment associated with a qualification requirement for an employment opportunity, each answer indicating an extent to which a candidate satisfies the qualification requirement for the employment opportunity;
obtaining information indicating outcomes relating to employment applications submitted by the plurality of candidates for employment opportunities associated with the plurality of assessments;
generating positive labels for positive outcomes and negative labels for negative outcomes; and;
providing as training data the plurality of answers and the positive labels and negative labels for training the machine learning model; and generating the match score for the first candidate and the employment opportunity, by:
obtaining answers by the first candidate to assessments relating to qualification requirements for one or more employment opportunities;
applying the machine learning model to the answers, additional features of the candidate, and qualification requirements for an additional employment opportunity to produce the match score between the candidate and the additional employment opportunity;
comparing the match score to a threshold to determine that a recommendation relating to the additional employment opportunity is to be presented to the candidate; and
causing the recommendation relating to the additional employment opportunity to be presented to the candidate via a user interface.

* * * * *